June 5, 1945. J. H. BOOTH 2,377,397
FASTENING MEANS
Filed April 16, 1943
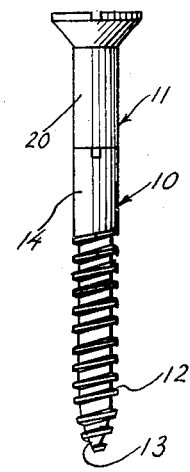
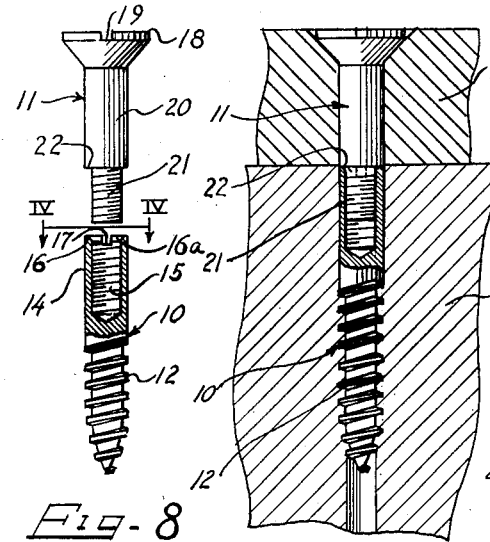
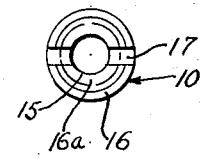
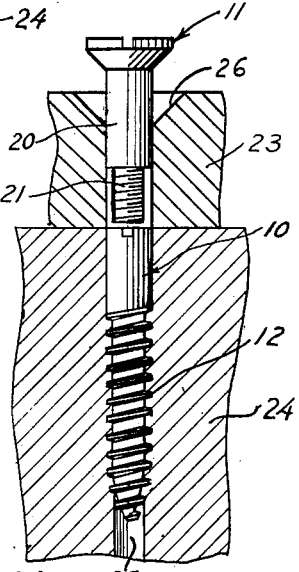
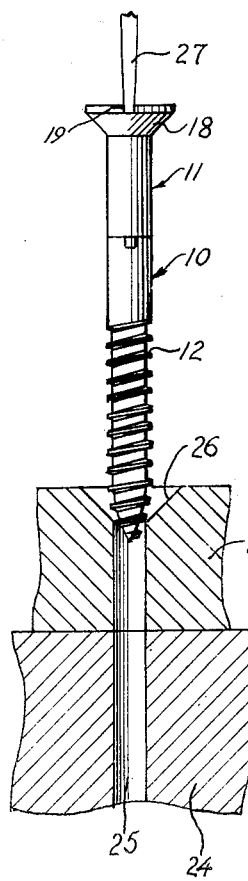
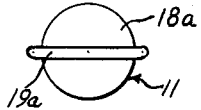
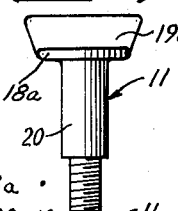
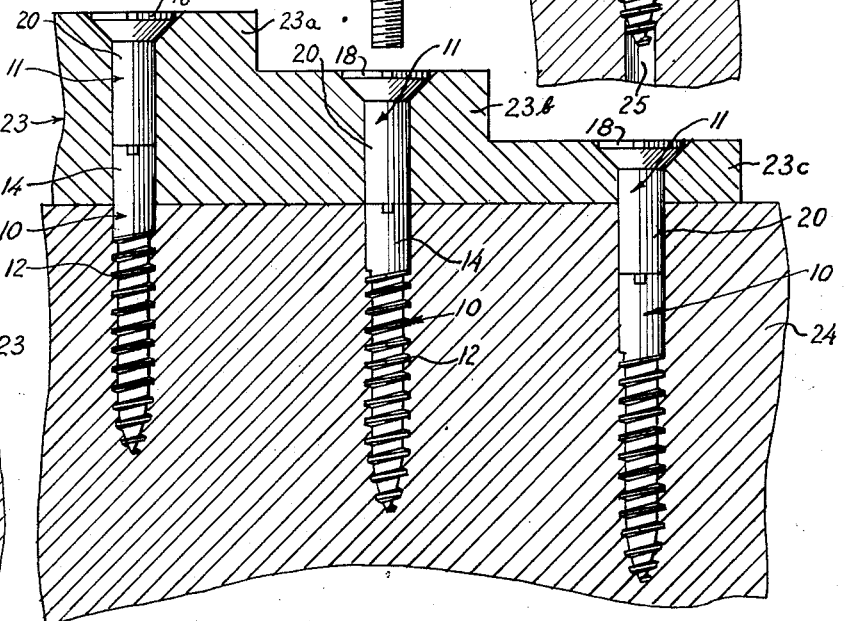
Inventor
JAMES H. BOOTH
by Charles W. Hills Attys.

Patented June 5, 1945

2,377,397

UNITED STATES PATENT OFFICE 2,377,397

FASTENING MEANS

James H. Booth, Detroit, Mich., assignor to Thompson Products, Inc., a corporation of Ohio Application April 16, 1943, Serial No. 483,250

1 Claim. (Cl. 85—41)

This invention relates to fasteners adapted to be secured as units in wood parts or the like and capable of being separated into two pieces whereby the wood parts or the like can be detachably connected.

Specifically, the invention relates to a wood screw composed of a headless female member with an externally threaded solid portion and a hollow internally threaded portion together with a male member having a reduced-diameter externally threaded shank portion, a smooth shank portion, and a head portion.

According to this invention two-piece wood screws are provided which can be rotated into wood parts as units and which will separate into their constituent parts upon reverse rotation.

The fasteners of this invention are especially useful in detachably securing lids on wooden boxes. These fasteners include a pointed rod-like female member having an external wood screw thread extending from the pointed end thereof into spaced relation from the other end thereof. This other end has a smooth cylindrical outer portion of the same diameter as the major diameter of the thread. The cylindrical portion is adapted to be seated in a wall of the box or, in the event that the lid for the box is quite thick, the cylindrical portion can project above the top of the box in non-gripping engagement with the lid, so that the lid can be removed. The cylindrical end of the female member is hollow and internally threaded. A screwdriver slot is provided in the end of the hollow cylindrical portion so that the female member can be removed from the box if desired.

A male member having a cylindrical shank portion of the same diameter as the cylindrical hollow portion of the female member is equipped with a reduced-diameter externally threaded stem end for threaded engagement in the female member. A shoulder is formed between the threaded stem portion and the cylindrical shank portion for bottoming on the end of the hollow cylindrical portion of the female member. The stem is shorter than the recess provided by the hollow female member so that the shoulder will bottom on the rim edge of the female member. The male member has a head on the end thereof equipped with either a screwdriver slot therein or an upwardly extending wing or rib adapted to be engaged for rotation.

The fastener can be rotated into a pilot hole through a lid and wooden box for threading the female member into the box. The male member can be removed from the female member upon reverse rotation and the lid is thus detachably secured to the box.

It is, then, an object of this invention to provide a fastener adapted to be secured as a unit in a plurality of parts to connect the parts and adapted to be separated into two pieces whereby the previously connected parts can be separated.

A further object of the invention is to provide a wood screw composed of a male member having an enlarged head thereon, a cylindrical shank portion extending from the head, and a reduced-diameter externally threaded stem end together with a female member having a hollow internally threaded socket for receiving said stem end of the male member and an externally threaded portion for threaded engagement in wood or the like.

A still further object of the invention is to provide a headed two-part screw adapted to be threaded into wood as a unit by rotation in one direction and adapted to be separated into two parts after being secured in the wood by reverse rotation to leave one part remaining in the wood and to release the headed part from the wood whereby the wood parts are detachably connected.

A still further object of the invention is to provide a two-piece wood screw adapted to detachably secure lids of different thicknesses on wooden boxes.

A still further object of the invention is to provide a wood screw which can be driven into wood as a unit and which can be separated into two parts after being driven into the wood upon reverse rotation.

Other and further objects of the invention will be apparent to those skilled in the art from the following detailed description of the annexed sheet of drawings which, by way of preferred examples only, illustrates two embodiments of the invention together with useful applications of the invention.

On the drawing:

Figure 1 is a side elevational view of a wood screw according to this invention.

Figure 2 is a side elevational view, with parts broken away and shown in vertical cross section, of the wood screw of Figure 1 but illustrating the two parts of the screw in separated relation.

Figure 3 is a view similar to Figure 2 but illustrating the screw in position for securing a lid on a wooden box.

Figure 4 is a plan view taken along the line IV—IV of Figure 2.

Figure 5 is a side elevational view of the wood screw illustrating the manner in which it is driven into a pilot hole through a lid and wooden box shown in vertical cross section.

Figure 6 is a vertical cross-sectional view of a wooden box and a stepped lid therefor illustrating, in side elevation, the manner in which a standard wood screw according to this invention can detachably secure the lid to the box at areas of the lid having widely different thicknesses.

Figure 7 is a view similar to Figure 6 illustrating the manner in which the screw parts are separated to remove the lid from the box.

Figure 8 is a top plan view of a modified head for a wood screw according to this invention.

Figure 9 is a side elevational view of the modified screw part shown in Figure 8.

As shown on the drawing:

In Figure 1, the reference numeral 10 designates generally the female part of a screw according to this invention while the reference numeral 11 designates generally the male part of the screw. The female part 10 has an external wood screw thread 12 extending from a pointed end 13 thereof into spaced relation from the other end thereof. A smooth cylindrical shank portion 14 extends from the end of the screw thread 12 to the top of the part 10 and this portion 14 has a diameter the same as the major diameter of the thread 12.

As shown in Figure 2, the shank portion 14 of the female member 10 is hollow and internally threaded with a machine screw thread 15. A rim end 16 is provided at the end of the shank 14 and this rim end can be beveled inwardly as at 16a to guide a member into the hollow interior of the shank 14. A transverse screwdriver slot 17 is formed in the rim 16 as best shown in Figure 4.

The male part 11 has an enlarged headed end 18 with a screwdriver slot 19 therein, a smooth cylindrical shank portion 20 depending from the head 18 and a reduced diameter stem end 21 depending from the shank 20. The stem end 21 is externally threaded with a machine thread that fits the thread 15. A shoulder 22 is provided between the shank 20 and the stem 21 for bottoming on the rim 16 of the member 10.

As shown in Figure 3, the wood screw of this invention is especially useful for detachably securing a lid 23 on a wooden box 24 with the part 10 of the screw threaded into the box 24, and terminating flush with the top edge of the box and with the part 11 of the screw seated in the lid 23 but having the stem end 21 thereof threaded into the hollow portion of the member 10 so as to seat the shoulder 22 on the rim end of the member 10. The stem 21 is shorter than the recess provided in the female member 10 so that the shoulder 22 will engage the rim end of the female part 10.

The thread on the stem 21 and the thread 15 of the female member are of the same hand as the wood thread 12 so that, as shown in Figure 5, the wood screw can be driven as a unit into a straight pilot hole 25 provided through the lid 23 and extending into the box 24. A countersunk portion 26 can be provided in the lid 23 at the top end of the pilot hole 25 for receiving the head 18 of the wood screw. A screwdriver 27 can be seated in the slot 19 of the head 18 for rotating the screw through the pilot hole in the lid 23 and into the pilot hole of the box 24 for securing the wood threads 12 into the wood of the box as shown in Figure 7.

As shown in Figure 7, the male part 11 of the screw can be removed from the female part 10 without removing the female part from the box 24 by reverse rotation of the male part. This reverse rotation will unscrew the stem 21 from the female part and will automatically raise the male part above the lid 23. The shank 20 of the male part is smooth and has a sliding fit with the lid 23. The male part is thus readily removed from the lid and the lid can be removed from the box. The female part preferably is flush with the top of the box 24 as shown in Figures 3 and 7 so that no projecting screw parts are provided. As a result, boxes equipped with screws of this invention can be readily stacked even with the lids removed and the lids can be stacked without interference because the male members 11 can be removed therefrom.

As shown in Figure 6, the wood screws of this invention have universal application even though the lid 23 is stepped and has portions 23a, 23b and 23c of different thickness. Alternately, of course, individual lids of different thicknesses could be used.

As shown in Figure 6 the wood screw for securing the thickest portion 23a of the lid 23 to the box 24 has the smooth cylindrical portion 14 of the female part 10 extending above the top of the box 24. Since this portion 14 is smooth, the lid 23 could be readily removed from the box by removal of the male member 11 from the female member 10.

At the portion 23b of the lid 23, however, the smooth portion 14 of the female part 10 is flush with the top of the box and no part of the female member projects above the box. This is the preferred mounting.

As shown at 23c in Figure 6 of the drawings, the female member 10 of the wood screw is below the top end of the box 24 and the cylindrical shank 20 of the male member 11 extends through the lid portion 23c and into the box 24. Since this cylindrical portion 20 of the male member is smooth and of the same diameter as the major diameter of the female part 10, the male part 11 can readily be removed from the lid portion 23c to permit separation of the lid from the box.

Figure 6 thus illustrates how the wood screws of this invention are universally applicable to detachably connect wood parts of different thicknesses since the female parts of the screws can be positioned at various levels in a wood part without interfering with the connection and the desired subsequent separation of the wood parts.

Since the portion 20 of the male member 11 has the same diameter as the portion 14 of the female member, and since this portion 14 of the female member is of the same diameter as the major diameter of the wood screw 12 the entire non-threaded shank portion of the resulting screw unit will snugly fit in the hole formed by the threaded end 12 of the screw. In addition, the recess in the female member containing the internal machine screw thread 15 is provided at an area of greatest diameter of the screw unit so that a relatively large socket can be provided for the stem end of the male member, and the stem end of the male member can be of a major diameter, thereby increasing the strength of the unit.

Since the stem 21 of the male member is shorter than the depth of the socket provided by the female member, the shoulder 22 of the male member limits the degree of insertion of the stem into the socket and prevents damaging of the stem threads which might otherwise occur if no such limiting means were provided.

The screws of this invention could, of course, be directly driven into wood pieces not equipped with pilot holes but, if pilot holes are used, the same can be straight diameter holes since the parts of the screw are arranged to fit in a pilot hole of a single diameter.

As shown in Figures 8 and 9, the male part 11 of the screw has a head 18a in the form of a flat disk at the upper end of the cylindrical shank portion 20 and a vertical flange or rib 19a is provided on the head 18a in place of the screwdriver slot 19. This flange forms a wing which can be manually grasped or engaged with a wrench or other tool for rotating the member 11.

From the above descriptions it will be understood that this invention provides fasteners composed of two parts in threaded engagement. The two-part fasteners are mounted in position as a unit by rotating the unit into wood parts or the like. Reverse rotation will disengage the screw parts.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

A wood screw comprising a headless female member having an externally threaded solid portion terminating in a point at one end of the member and a hollow internally threaded portion with a smooth cylindrical outer wall extending from the externally threaded portion to the other end of the member, said hollow portion having a rim end, said cylindrical outer wall of the hollow portion having the same diameter as the major diameter of the externally threaded solid portion, and a headed male member having a cylindrical shank portion of the same diameter as the hollow portion of the female member so that said male and female members may relatively tightly fill the bore in a pair of wood pieces which are adapted to be attached together by said wood screw, an enlarged head on one end of said shank portion, a reduced-diameter externally threaded portion depending from the other end of the shank portion and a shoulder between the reduced-diameter portion and the shank, said reduced-diameter externally threaded portion of the male member fitting the hollow interior threaded portion of the female member in threaded engagement and being shorter than the hollow portion to allow the shoulder of the male member to engage the rim end of the female member, and all of said threads being of the same hand for insertion of the screw as a unit into the wood while causing separation of the male member from the female member upon reverse rotation of the male member, said rim end of said hollow portion having a screwdriver slot so that said female member may be withdrawn from the wood after the male member has been unscrewed from the female member and withdrawn from the wood.

JAMES H. BOOTH.